US009052459B2

(12) United States Patent
Compton et al.

(10) Patent No.: US 9,052,459 B2
(45) Date of Patent: Jun. 9, 2015

(54) CABLE ASSEMBLY AND METHOD

(71) Applicant: Corning Cable Systems LLC, Hickory, NC (US)

(72) Inventors: Brandon Duvall Compton, Granite Falls, NC (US); Michael Todd Faulkner, Granite Falls, NC (US); Julie Xiong Gladden, Vale, NC (US); Lars Kristian Nielsen, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 86 days.

(21) Appl. No.: 13/788,807

(22) Filed: Mar. 7, 2013

(65) Prior Publication Data

US 2013/0251319 A1 Sep. 26, 2013

Related U.S. Application Data

(60) Provisional application No. 61/755,580, filed on Jan. 23, 2013, provisional application No. 61/614,839, filed on Mar. 23, 2012, provisional application No. 61/623,875, filed on Apr. 13, 2012.

(51) Int. Cl.
*G02B 6/255* (2006.01)
*G02B 6/44* (2006.01)

(52) U.S. Cl.
CPC ............ *G02B 6/2558* (2013.01); *G02B 6/4471* (2013.01); *G02B 6/4495* (2013.01)

(58) Field of Classification Search
CPC .. G02B 6/2558; G02B 6/2551; G02B 6/3801; G02B 6/3806; G02B 6/2553; G02B 6/255

USPC ............................ 385/95, 96, 97, 98, 99, 100
See application file for complete search history.

(56) References Cited

U.S. PATENT DOCUMENTS

| | | | |
|---|---|---|---|
| 7,277,615 B2 | 10/2007 | Greenwood et al. | 385/100 |
| 7,454,106 B2 | 11/2008 | Cobb, III et al. | 385/100 |
| 7,471,862 B2 | 12/2008 | Bringuier et al. | 385/113 |
| 7,515,796 B2 | 4/2009 | Cody et al. | 385/100 |
| 7,787,727 B2 * | 8/2010 | Bringuier et al. | 385/113 |

(Continued)

FOREIGN PATENT DOCUMENTS

| | | | | |
|---|---|---|---|---|
| EP | 1031862 A3 | 6/2004 | | G02B 6/44 |
| EP | 1031862 B1 | 11/2005 | | G02B 6/44 |

OTHER PUBLICATIONS

Patent Cooperation Treaty, International Search Report and Written Opinion for International Application No. PCT/US2014/011997; Mailing Date Apr. 4, 2014—10 pages.

*Primary Examiner* — Jennifer Doan
(74) *Attorney, Agent, or Firm* — William D. Doyle

(57) ABSTRACT

A fiber optic cable assembly includes a distribution cable and a tether cable physically coupled thereto. The distribution cable has a cavity through which a fiber optic ribbon extends, and the tether cable includes a jacket and an optical fiber. The distribution cable includes a network access point at a midspan location, which includes an opening between the cavity to the exterior of the distribution cable. At least a portion of the ribbon extends through the opening. The ribbon of the distribution cable includes a plurality of optical fibers, and the optical fiber of the tether cable is spliced to an optical fiber of the ribbon. The corresponding spliced connection is surrounded by the jacket of the tether cable, whereby the jacket serves as a housing.

20 Claims, 7 Drawing Sheets

(56) References Cited

U.S. PATENT DOCUMENTS

| | | | |
|---|---|---|---|
| 7,840,109 B2 | 11/2010 | Lu et al. | 385/114 |
| 7,941,021 B2 | 5/2011 | Cody et al. | 385/100 |
| 7,945,133 B2 * | 5/2011 | Cody et al. | 385/113 |
| 2005/0259928 A1 | 11/2005 | Elkins, II et al. | 385/100 |
| 2007/0098342 A1 | 5/2007 | Temple, Jr. et al. | 385/113 |
| 2007/0263964 A1 | 11/2007 | Cody et al. | 385/100 |
| 2008/0170828 A1 | 7/2008 | Elkins et al. | 385/95 |
| 2009/0022460 A1 | 1/2009 | Lu et al. | 385/114 |
| 2010/0054679 A1 | 3/2010 | Cody et al. | 385/113 |
| 2010/0158453 A1 | 6/2010 | Cody et al. | 385/100 |

* cited by examiner

CABLE ASSEMBLY AND METHOD

RELATED CASES

This application claims the benefit of priority under 35 U.S.C. §119 of U.S. Provisional Application Ser. No. 61/755,580 filed on Jan. 23, 2013, U.S. Provisional Application Ser. No. 61/614,839 filed Mar. 23, 2012, and U.S. Provisional Application Ser. No. 61/623,875 filed Apr. 13, 2012, the content of each of which is relied upon and incorporated herein by reference in its entirety.

BACKGROUND

Aspects of the present disclosure relate generally to fiber optic cable assemblies. More specifically, aspects of the present disclosure relate to features of fiber optic cable assemblies supporting spliced connection(s) between optical fibers.

Some aspects of the present disclosure relate generally to a fiber optic network access point assembly, such as where a fiber optic tether cable connects to a fiber optic distribution cable; and to methods of manufacturing the same. The network access point may be a mid-span access point on the distribution cable. The tether cable may then connect the distribution cable to a node on the fiber optic network, bringing optical fiber connectivity to a home or business. Typically a tether cable is spliced to one or more optical fibers carried by the distribution cable. The splice may be a particularly sensitive location in the respective optical pathway and may therefore be protected by a splice protector.

Other aspects of the present disclosure relate generally to splice protectors for multi-fiber splicing such as splicing of fiber optic ribbons, where the splice protector surrounds and supports the splice to provide structural reinforcement to the area of the splice. However, splice protectors may be bulky and rigid, interfering with the ability to bend a spliced fiber optic ribbon and corresponding cable assembly on a reel or spool, or the ability to place the spliced ribbon in a narrow cavity. Accordingly, splices and splice protectors are typically housed in an index tube or other housing that is wide enough to support the splice. The index tube may be located proximate to the network access point, outside of both the distribution cable and the tether cable.

A similar situation may be found with fiber optic connectors that are factory manufactured with optical fibers built into the connectors, where the optical fibers are subsequently spliced to a fiber optic cable, such as a "pig-tail" cable. The fiber optic cables for such assemblies may be sized to house the corresponding optical fibers, but may not have a cavity large enough to house and support the splice and corresponding splice protector. Instead, additional structure is typically added to the pig-tail and/or the connector to support the splice and splice protector, such as a tube or extended connector boot. As a result, such a cable assembly may be bulky and not particularly maneuverable.

In some cases, multiple tether cables or "pig-tails" are attached to a distribution cable at the same network access point or the same end of the cable. However, splices and splice protectors for each offshoot may interact with one another, especially if located together, such as in a common index tube. For example, as the cable assembly stretches and bends, the splices and the corresponding splice protectors may wear on each other by sliding and rubbing against one another, wedge one another into a fixed location, or otherwise influence each other. Furthermore, the combination of multiple slices and corresponding splice protectors may be particularly bulky, making locating the splices in a common, confined location difficult and/or making the corresponding cable assembly cumbersome.

A need exists for a cable assembly that efficiently supports a spliced connection of optical fibers, such as one that includes multiple tethers connected to the same network access point without damaging or overcrowding the splice protectors and corresponding spliced connections. Furthermore, a need exists for a cable assembly that efficiently supports a spliced-on connection of optical fibers, while allowing the spliced-on connection to flex and bend, as may facilitate placement of the corresponding splice in an actively handled cable assembly.

SUMMARY

One embodiment relates to a fiber optic cable assembly, which includes a distribution cable and a tether cable physically coupled to the distribution cable. The distribution cable has a cavity through which a fiber optic ribbon extends, and the tether cable includes a jacket and an optical fiber. The distribution cable includes a network access point at a mid-span location, which includes an opening between the cavity to the exterior of the distribution cable. At least a portion of the ribbon extends through the opening. The ribbon of the distribution cable includes a plurality of optical fibers, and the optical fiber of the tether cable is spliced to an optical fiber of the ribbon. The corresponding spliced connection is surrounded by the jacket of the tether cable such that the jacket serves as a housing.

Another embodiment relates to a cable assembly that includes first and second fiber optic ribbons, a splice protector, and a housing surrounding the splice protector. Each ribbon includes a plurality of optical fibers arranged side-by-side with one another and bound together by a common matrix. The optical fibers of the first ribbon are spliced with the optical fibers of the second ribbon such that the ribbons at the spliced connection have a common lengthwise axis, widthwise axis, and thickness axis. The splice protector supports the optical fibers of the first and second fiber optic ribbons at the spliced connection. The housing includes a jacket of a fiber optic cable supporting the first fiber optic ribbon, and the second fiber optic ribbon extends into the housing from an end of the jacket. In some embodiments, the splice protector is at least half as flexible as the first and second ribbons in bending about the widthwise axis.

Yet another embodiment relates to a fiber optic cable assembly that includes a fiber optic cable and a multi-fiber connector. The fiber optic cable includes a jacket and has a cavity through which a fiber optic ribbon extends. The ribbon comprises a plurality of optical fibers arranged side-by-side with one another and bound together by a common matrix. The multi-fiber connector supports optical fibers that are fusion spliced to the ribbon of the fiber optic cable, where the corresponding spliced connection is surrounded by the jacket of the fiber optic cable. As such, the jacket serves as a housing for the spliced connection and splice protector.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments now described in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
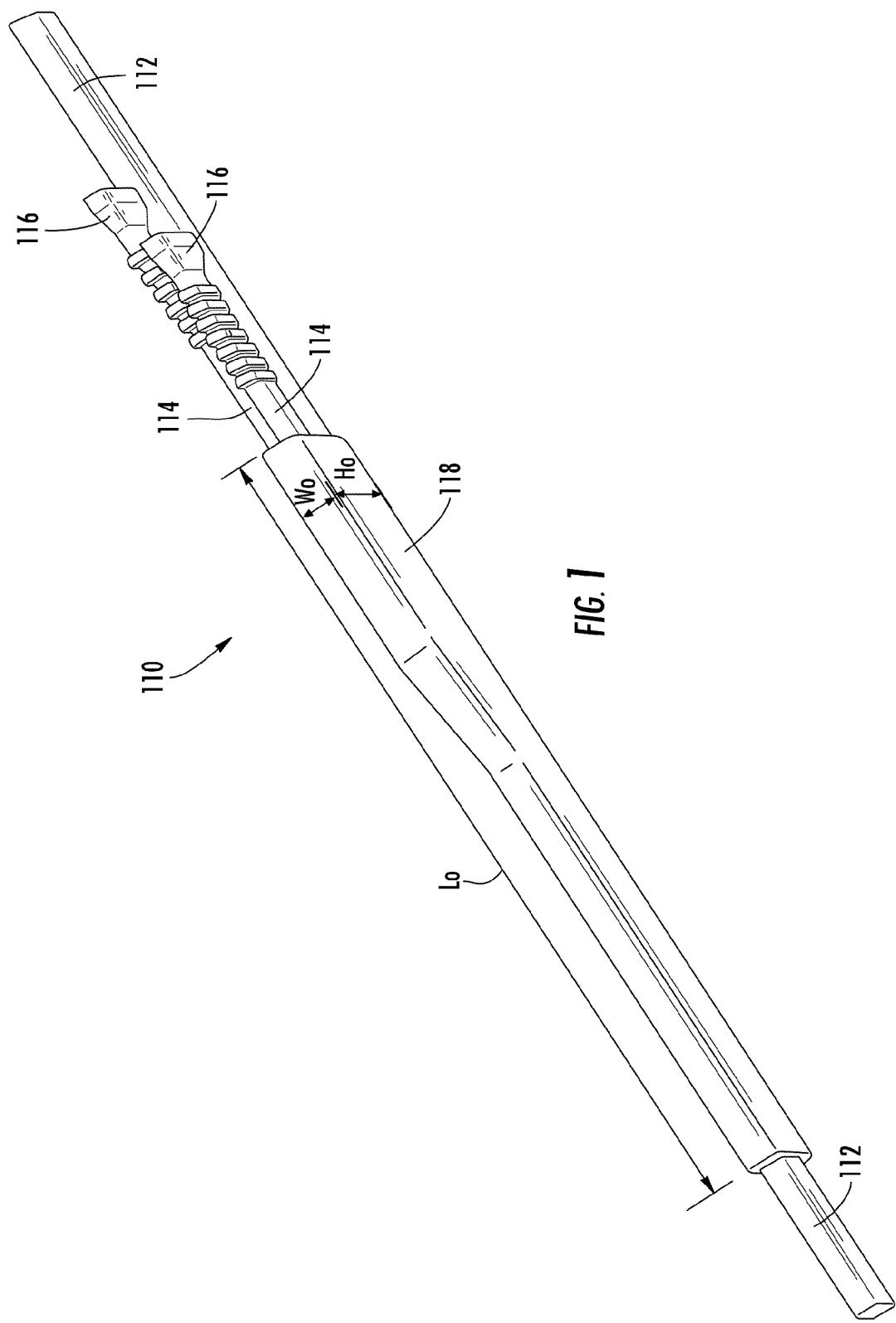
FIG. 1 is a perspective view of a fiber optic cable assembly according to an exemplary embodiment.

Referring to FIG. 1 a fiber optic cable assembly, in the form of a dual-tether network access point assembly 110, includes tether cables 114 (e.g., legs, extensions, branches) connected to a distribution cable 112 at a mid-span location on the distribution cable 112, where "mid-span" refers to a position along the length of the cable, as opposed to on an end thereof. The network access point assembly 110 may be used for routing a subset of optical fibers carried by the distribution cable 112 to homes or businesses along the path of the distribution cable 112, or for other purposes. In other contemplated embodiments, a fiber optic cable assembly includes only a single tether 114, or more than two tethers 114 extending from the same network access point. Still other embodiments include one or more "pig-tails" coupled to the end of a fiber optic cable.

According to an exemplary embodiment, the subset of optical fibers carried by the distribution cable 112 and coupled to the optical fibers of the tether cable 114 may include a six- or twelve-fiber group of optical fibers, which may be loosely arranged or coupled together in ribbons. In other embodiments, the subset of optical fibers may include other numbers of optical fibers, such as one optical fiber or a three-ribbon stack. Such ribbons may include a plurality of optical fibers arranged side-by-side with one another and bound to one another by a common matrix, such as an ultraviolet light curable resin (e.g., acrylate). If loosely arranged, the optical fibers may be supported in a common buffer tube or micromodule sheath.

According to an exemplary embodiment, the tethers 114 are connectorized, meaning optical fibers (e.g., one fiber, six fibers, a twelve-fiber ribbon) of the tethers 114 are connected to a fiber optic connector 116, such as an SC connector, an MPO connector, an LC connector, composite connector for optical fibers and active copper, or another type of connector. Accordingly, a first end of each tether 114 (e.g., proximal end) is physically coupled to the distribution cable 112 and housed in an overmold 118, and a second end of each tether 114 (e.g., distal end) includes the connector 116.

Figure 2:
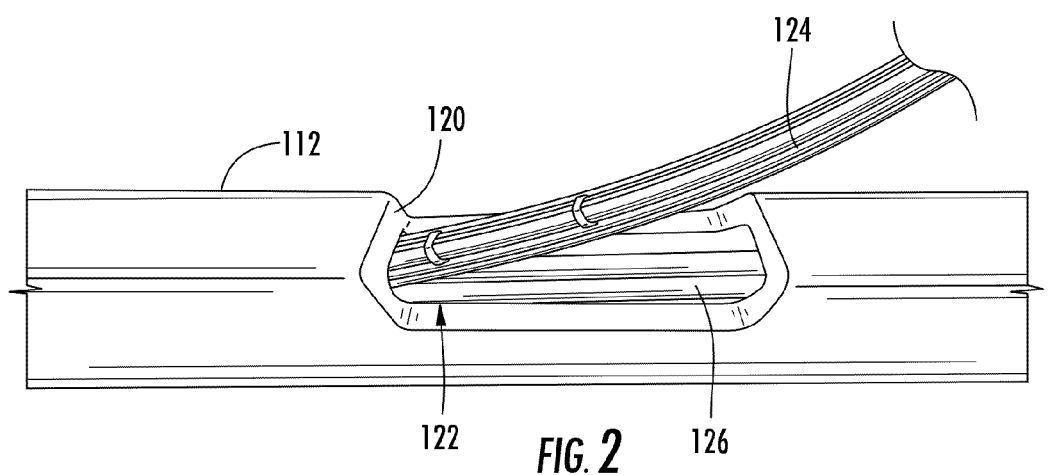
FIG. 2 is a perspective view of a fiber optic ribbon extending from a mid-span opening in a fiber optic cable from a perspective view according to an exemplary embodiment.
Figure 3:
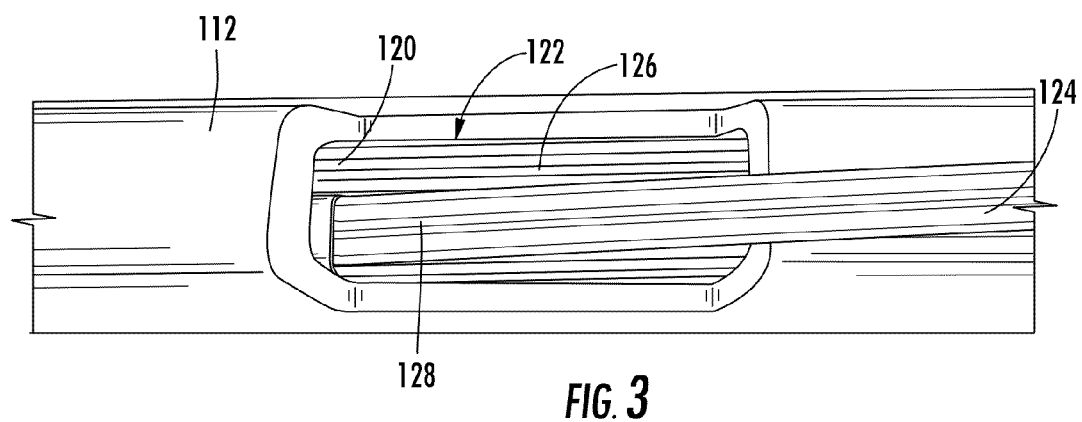
FIG. 3 is a perspective view of the fiber optic cable of FIG. 2 with the ribbon locked to the cable with an epoxy potting material from a top view according to an exemplary embodiment.

Referring now to FIGS. 2-3, in some embodiments, the distribution cable 112 may include an opening 120 providing access to an internal cavity 122 of the distribution cable 112. In some such embodiments, the cavity 122 supports a stack of fiber optic ribbons 126 (e.g., at least three), and the opening 120 is wide enough to allow at least a portion of at least one fiber optic ribbon 124 to extend from the cavity 122 through the opening 120. The portion 124 may be a subset of optical fibers from the ribbon, such as half of the ribbon (e.g., a six-fiber ribbon formed from splitting a twelve fiber ribbon). In contemplated embodiments, the cavity 122 may support buffer tubes containing loose optical fibers, micromodules containing tight-buffered optical fibers, stranded elements, conductive members, and/or other elements.

In some embodiments, a potting material 128 (e.g., epoxy), as shown in FIG. 3, may be used to lock ribbons 126 and/or the portion of the ribbon 124 extending from the cavity 122, to the jacket of the distribution cable 112. In some applications, locking the ribbons may limit propagation of stress or translation to the portion of the fiber optic ribbon 124 extending from the cavity 122. In other applications, free translation of the ribbons may be beneficial (see, e.g., FIG. 11 and corresponding text below).

Figure 4:
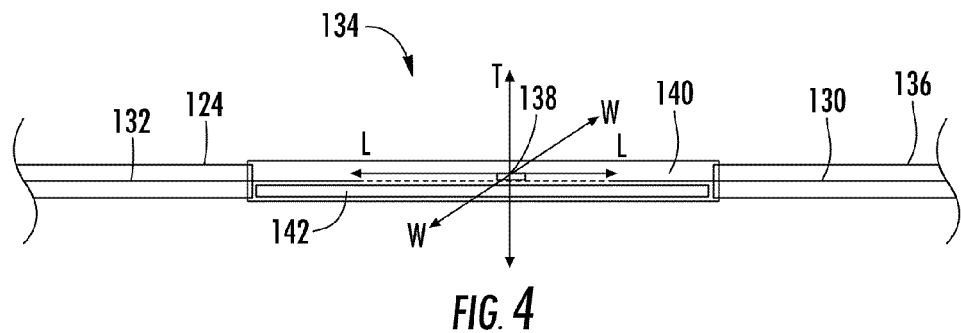
FIG. 4 is side view of a spliced connection between optical fibers, such as optical fibers of fiber optic ribbons, and a corresponding splice protector according to an exemplary embodiment.
Figure 5:
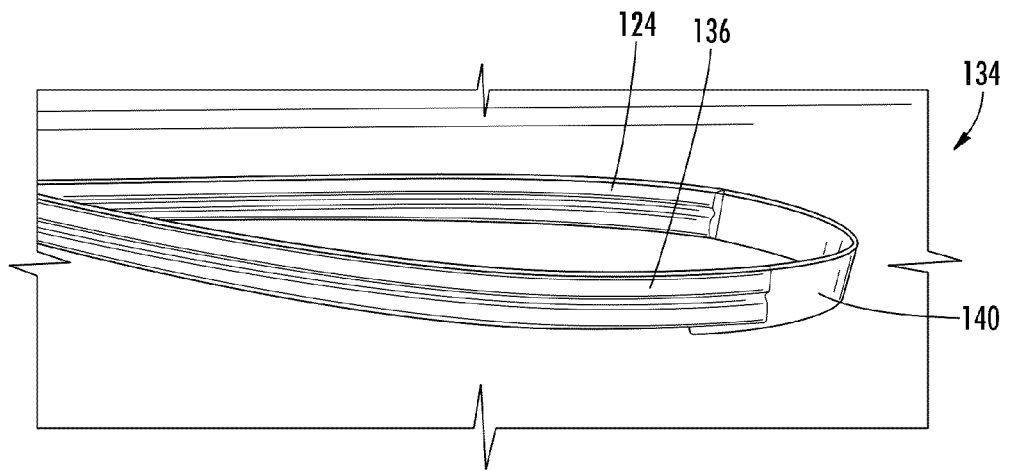
FIG. 5 is perspective view of a spliced connection between fiber optic ribbons and a corresponding splice protector from a perspective view according to an exemplary embodiment.

In some embodiments, such as those shown in FIGS. 4-5, once extracted from the cavity 122 of the distribution cable 112, optical fibers 132 of the portion of the fiber optic ribbon 124 may then be spliced (e.g., fusion spliced, mechanically spliced, or otherwise spliced) to additional optical fiber(s) 130, such as those of a ribbon 136 of the tether cables 114. The spliced connection 138 may be supported by a splice protector, such as a low-profile, flexible splice protector 140 shown in FIGS. 4-5 that is configured to be placed in particularly narrow locations in a cable assembly, such as within the cavity of the tether cable 114.

The first and second fiber optic ribbons 124, 136 (side view) shown in FIG. 4 each include a plurality of optical fibers 132, 130, such as at least 2, at least 6, or at least 12 optical fibers. According to an exemplary embodiment, the optical fibers 132 of the first ribbon 124 are fusion spliced with the optical fibers 130 of the second ribbon 136 such that the spliced ribbons 124, 136 at the spliced connection 138 have a common lengthwise axis L, widthwise axis W (orthogonal to the lengthwise axis L), and thickness axis T (orthogonal to the lengthwise and widthwise axes, L, W).

According to an exemplary embodiment, the splice protector 140 supports the optical fibers 132, 130 of the first and second fiber optic ribbons 124, 136 and includes an ultraviolet light (UV-) curable adhesive that provides a flexible support for the spliced connection 138. The UV-curable adhesive encapsulates the spliced connection 138 of the first and second ribbons 124, 136 and provides tensile strength to the spliced connection 138. Various types of commercially-available UV-curable adhesives are contemplated for use with the splice protector 140, some of which have undergone testing by the Applicants. Examples of UV-curable adhesives for the splice protector 140 include commercially-available UV-curable adhesives manufactured by PENN COLOR and commercially-available UV-curable adhesives manufactured by LOCTITE. More specifically, the PENN COLOR UV-curable adhesives contemplated for use with splice protectors include material numbers are 706, RP54, 518, and RS81 and the LOCTITE UV-curable adhesives contemplated for use with splice protectors include LOCTITE® 3974™ LIGHT CURE and LOCTITE® 3106™ LIGHT CURE.

In some embodiments, the splice protector 140 is at least a quarter as flexible as either of the first and second ribbons 124, 136 in bending about the widthwise axis W (e.g., at least half, at least 60%, at least 75%), where flexibility or stiffness corresponds to the stiffness coefficient (i.e., force applied over resulting displacement) of the respective element. For example, flexibility may be observed with a moment required to bend the splice protector 140 about the widthwise axis W and an equal length of one of the ribbons 124, 136 in a cantilever arrangement (full moment connection) by a vertical deflection of the free end that is ten percent of the length. In some such embodiments, the splice protector 140 is at least as flexible as the first and second ribbons 124, 136 in bending about the widthwise axis W.

Flexibility allows the splice protector 140 and spliced connection 138 to bend and move with the spliced ribbons 124, 136 around curved surfaces, such as a spool or reel for a corresponding fiber optic cable or assembly that includes the spliced ribbons 124, 136. With sufficient flexibility, the splice protector 140 may be less likely to pin or otherwise load the optical fibers 132, 130 of the ribbons 124, 136, particularly at the lengthwise ends of the spice protector 140. The improved flexibility may lead to improved reduced-attenuation performance of the optical fibers 132, 130 and may reduce stress concentrations of the optical fibers 132, 130 and the spliced connection 138.

According to an exemplary embodiment, the splice protector 140 has a low-profile, which is facilitated by molding the UV-curable adhesive to confirm to the shape of the adjoining ribbons. In some embodiments, the splice protector 140 has a thickness in the thickness axis T that is, on average, less than 2 mm (e.g., less than 1 mm, less than 0.75 mm, less than 0.5 mm) thicker than either the first or second fiber optic ribbons 124, 136. Furthermore, in some embodiments the splice protector 140 has a narrow-profile, having a width in the width axis W that is, on average, less that 2 mm (e.g., less than 1 mm, less than 0.75 mm, less than 0.5 mm) wider than either the first or second fiber optic ribbons 124, 136 in the width axis W.

According to one example, a twelve-fiber ribbon has a width of about 3.1 mm and thickness of about 0.3 mm. A corresponding twelve-fiber UV-curable adhesive splice protectors form in a splice mold (e.g., joined Teflon sheets), has a length of 30 mm, a width of 3.9 mm, a thickness of 1.25 mm, and does not include a substrate in addition to the mold. In such an example, the splice mold defines the exterior of the splice protector 140. In another example, a splice protector 140, at least partially formed from UV-curable adhesive, for twelve-fiber ribbons has a length of 27 mm, a width as small as 3.3 mm, a thickness as thin as 0.6 mm, and does not include a substrate where the mold has been removed upon solidification of the adhesive.

A narrow- and low-profile splice protector 140 allows the spliced connection 138 to be inserted into a correspondingly narrow structure, such as inside a furcation tube, the jacket of a distribution cable, the jacket of a tether cable, a narrow overmold, or another supporting structure. The narrow- and low-profile structure surrounding the splice protector 140 then allows for translation of the associated cable assembly 110 within correspondingly narrow ducts or other confined spaces, which may improve installation of the associated cable assembly 110 in a data center or elsewhere.

As used herein, a "substrate" for a splice protector is a rigid member that reinforces the material of the splice protector, such as a glass-, plastic-, or ceramic-sheet or rod that prevents over-bending that may damage the spliced connection. For example, in some embodiments, the splice protector 140 includes a substrate 142 to provide extra strength to the splice protector 140. In some embodiments, the substrate 142 is a thin polymeric material, such as Teflon, placed interior to the mold, between the mold and the optical fibers 132, 130. In some embodiments, the splice protector 140 is a thin, flexible glass sheet (e.g., sheet of WILLOW™ glass or sheet CORNING® GORILLA® GLASS both manufactured by Corning Incorporated of Corning, N.Y.). In some such embodiments, the thin, flexible glass sheet is less than 0.25 mm thick, such as about 0.15 mm thick, and therefore does not greatly increase the profile of the splice protector 140. The substrate 142 may be integrated or integral with the mold, or may be a separate body in addition to the mold. Put another way, the mold may serve as the substrate in addition to forming the shape of the adhesive.

In other embodiments, the splice protector 140 does not include a substrate. The cured UV-curable adhesive provides sufficient strength for the spliced connection 138. As such, in some embodiments, the splice protector 140 is primarily formed from UV-curable adhesive (e.g., at least 50% by volume), such as formed entirely from (e.g., consists of) UV-curable adhesive. Omission of the substrate significantly reduces the materials required for protecting the spliced connection 138, saving costs associated with the substrate as well as manufacturing time to prepare the substrate. Furthermore, using only UV-curable adhesive for the splice protector 140 provides increased reliability for the performance of the splice protector 140 by removing variability associated with interactions between different materials in the splice protector 140 and the specific fracture mechanics of the materials and corresponding interface.

In contemplated embodiments, the splice protector 140 includes a matrix or binding agent other than a UV-curable adhesive, such as an epoxy or other type of adhesive, thermoplastic, tape, or other material that may still provide flexibility and profile characteristics disclosed herein. However, such materials may not be as quick to cure, as uniform, as efficient to apply, and/or as flexible as UV-curable adhesive.

Methods and structures disclosed herein may not perform in the same way for single-fibers as with fiber optic ribbons. The ribbon profile allows for a greater volume of adhesive to be used without greatly increasing the profile of the splice protector about the splice, as disclosed herein. Single fibers may require a greater ratio of adhesive to achieve sufficient support for protection of the splice, which may decrease the relative flexibility of the spliced area relative to the corresponding optical fibers and/or increase the profile of the splice protector relative to the corresponding optical fibers. However, in some contemplated embodiments, a UV-curable adhesive or other adhesive may be used to support the spliced connection of single-fibers, such as with molds and/or substrates as disclosed herein.

As shown in FIG. 5, the splice protector 140 formed with the mold and UV-curable adhesive is flexible and may readily bend over a 1.25-inch mandrel without damaging the spliced connection 138 or splice protector 140. Furthermore, the bend radius of the splice protector 140 is not limited to 1.25 inches, as shown in FIG. 7.

Figure 6:
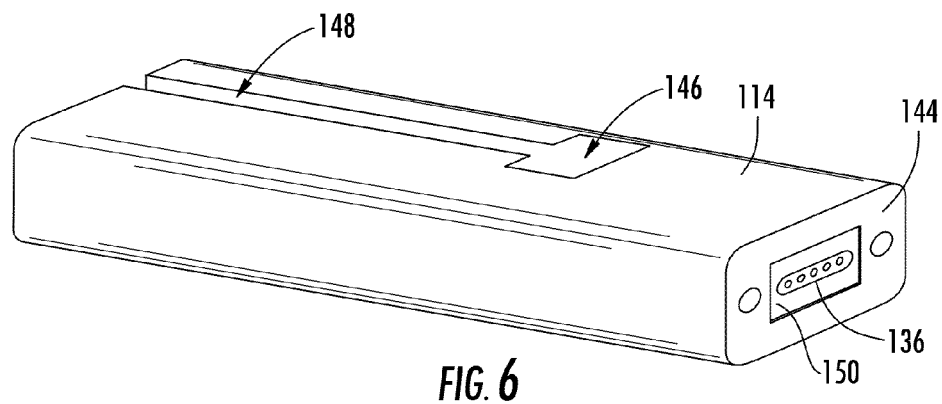
FIG. 6 is a perspective view of a fiber optic cable according to an exemplary embodiment.

Once optical fibers 132 of the distribution cable 112 are spliced to optical fibers 130 of the tether cable 114 and the corresponding spliced connection 138 is protected with the low-profile, flexible splice protector 140, the splice protector may then be housed within a jacket 144 of the corresponding tether cable 114 (see FIG. 6). For cable assemblies with multiple tethers 114 extending from the same network access point, housing the splice protectors 140 in the individual tether cables 114 isolates the spliced connections 138 from one another, reducing the likelihood that the splice protectors 140 with rub against one another or otherwise impact one another.

Figure 7:
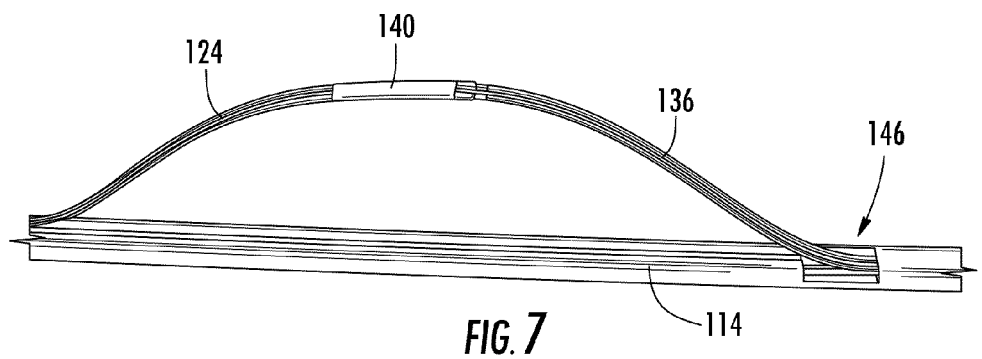
FIG. 7 is a perspective view of a spliced connection between fiber optic ribbons positioned outside of a jacket of a fiber optic cable from a perspective view according to an exemplary embodiment.
Figure 8:
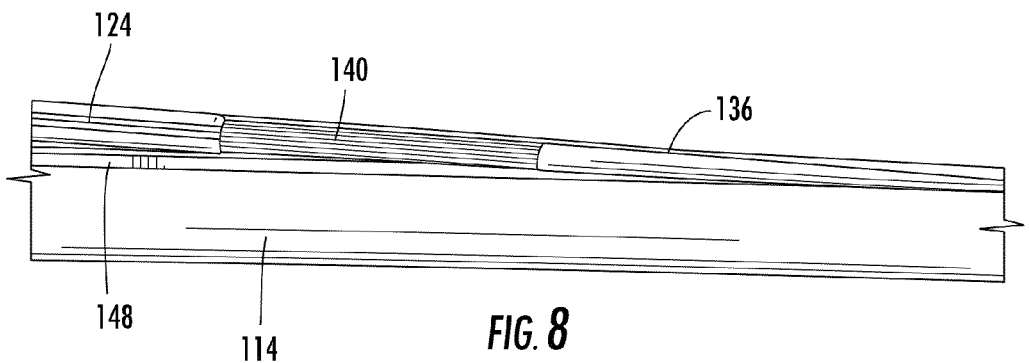
FIG. 8 is a perspective view of the spliced connection of FIG. 7 being inserted into the jacket of FIG. 7 from a perspective view according to an exemplary embodiment.
Figure 9:
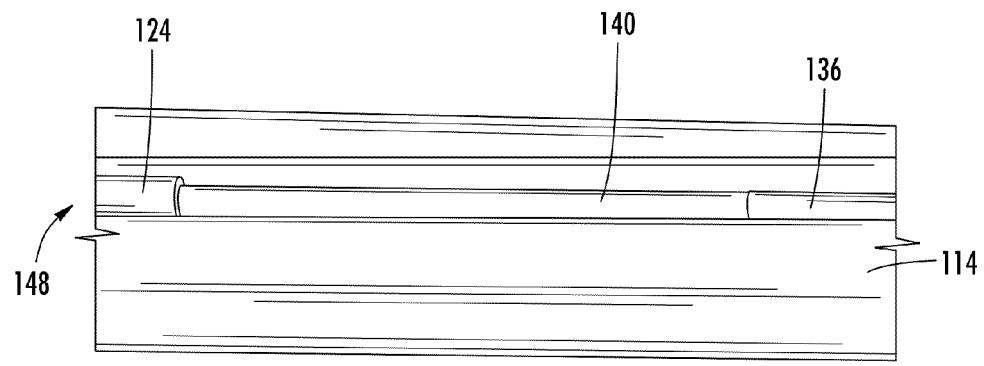
FIG. 9 is a perspective view of the spliced connection of FIG. 7 within the jacket of FIG. 7 seen through an opening in the jacket from a perspective view according to an exemplary embodiment.

FIGS. 6-9 show a way that the spliced ribbons 124, 136 and corresponding splice protector 140 may be inserted into the jacket 144 of the tether cable 114. As shown in FIGS. 6-7, an opening 146 may be cut into the jacket 144 of the tether cable 114, where the opening 146 is wide enough that optical fibers of the tether 114, such as in the form of the fiber optic ribbon 136, may be drawn out of the jacket, as shown in FIG. 7. An elongate slot 148, preferably narrower than the fiber optic ribbon 136 may then extend from the opening 146 to the end of the tether cable 114. As shown in FIG. 7, the first and second ribbons 124, 136 may be spliced outside of the distribution and tether cables 112, 114; and, as shown in FIG. 8, the splice protector 140 may then be inserted into the jacket 144 of the tether cable 114 through the elongate slot 148. Because the elongate slot 148 is preferably narrower than the fiber optic ribbon 136, once the ribbon 136 is positioned in the cavity 150 (FIG. 6), the jacket 144 serves to hold the splice protector 140 and ribbons 124, 136 in the jacket 144. Additionally, the jacket 144 of the tether 114 serves as a portion of a housing that surrounds the splice protector 140.

Figure 10:
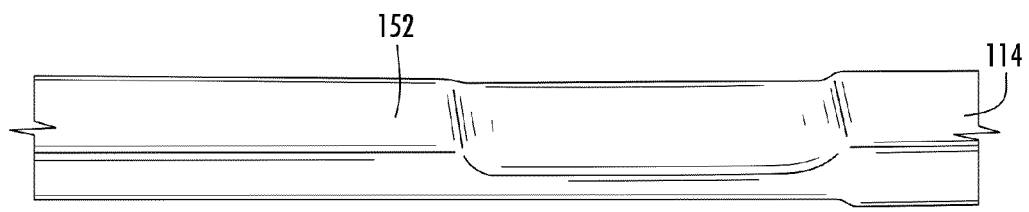
FIG. 10 is a perspective view of the jacket of FIG. 7 surrounded by a heat shrink tube from a perspective view according to an exemplary embodiment.
Figure 11:
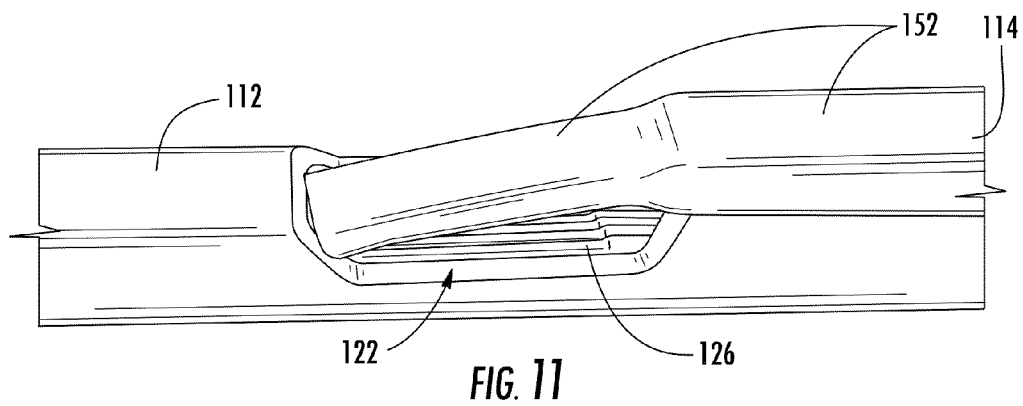
FIG. 11 is a perspective view of the heat shrink tube of FIG. 10 extending into the mid-span opening of the fiber optic cable of FIG. 2 from a perspective view according to another exemplary embodiment.

Referring now to FIGS. 10-11, once the ribbons 124, 136 are spliced and inserted into the housing, provided at least in part by the jacket 144 of the tether cable 114, a heat-shrink tube 152 or other structure may be drawn over the opening 146 and slot 148 to seal the cavity 150 of the tether cable 114. Referring specifically to FIG. 11, in some embodiments, the heat shrink tube may also serve to separate the ribbon 124 from potting material 128 (FIG. 2) or overmold 118 (FIG. 1) that fills the opening 122 of the distribution cable 112. In such embodiments, the spliced ribbon 124 extending from the cavity 122 of the distribution cable 112 is free to translate through the heat shrink tube 152. As shown in FIG. 1, once the spliced connection 138 is secured, in some embodiments an overmold 118 may be applied to the cable assembly 110 to encase and insulate the assembly 110. Because structures disclosed herein allow the spliced connection 138 to be housed in the jacket 114 of the tether cable, an index tube and/or other additional structure may be unnecessary, allowing the cable assembly 110 to have a particularly low profile.

According to an exemplary embodiment, the overmold 118 surrounds the network access point, forming a water-tight, weather-able seal. The overmold 118, in some embodiments, is formed mostly from polyurethane by weight (e.g., at least 50% by weight, at least 80% by weight; consisting essentially of polyurethane), which provides flexibility to the overmold 118. In other embodiments, other flexible polymers may be used for the overmold material (e.g., rubber, a polymerization of monomers, such as isoprene, 1,3-butadiene, chloroprene, and isobutylene with isoprene for cross-linking). According to an exemplary embodiment, the overmold 118 defines the outermost extent (i.e., exterior, outside) of the cable assembly 110.

In some embodiments, the overmold 118 has a length $L_O$ (FIG. 1) aligned with the lengthwise access of the distribution cable 112 that is at least five times as great as the largest cross-sectional dimension of the overmold orthogonal to the length (i.e., width $W_O$ or height $H_O$) such that the overmold 118 has a low profile and is configured to pass through narrow ducts. In some embodiments, the largest cross-sectional dimension of the overmold 118 orthogonal to the length $L_O$ is less than 5 inches (e.g., less than 3 inches, less than 2 inches, less than 1.25 inches (or metric equivalent distances)), such that the overmold 118 is capable of passage through a correspondingly-sized-diameter round duct or opening. The narrow, low-profile splice protector 140 facilitates the overall low-profile dimensions of the overmold 118 by allowing for the omission of the index tube and allowing use of the tether jacket 144 to house the splice protector 140.

According to an exemplary embodiment, the protected splice 138 is also able to flex within the tether cable 114 of the cable assembly 110 when operators install the cable assembly 110 around sheave wheels and the like. For example, sheave wheel testing at 600-lbs load with temperatures of −30° C. and 40° C., as per GR-3122 testing standards, have shown the protected spliced connection 138 to survive at these extremes. Use of the flexible overmold 118 allows for the overall assembly 110 to flex and to capitalize on the advantages achieved by the splice protector 140. Additionally, according to various contemplated embodiments, low-profile, flexible splice protectors 140 disclosed herein may be used with fiber optic assemblies other than those shown in the present Figures, including FlexNAP™ manufactured by Corning Cable Systems LLC of Hickory, N.C., or more-generally in assemblies that operate in tight areas where bending is expected or uncontrolled.

Figure 12:
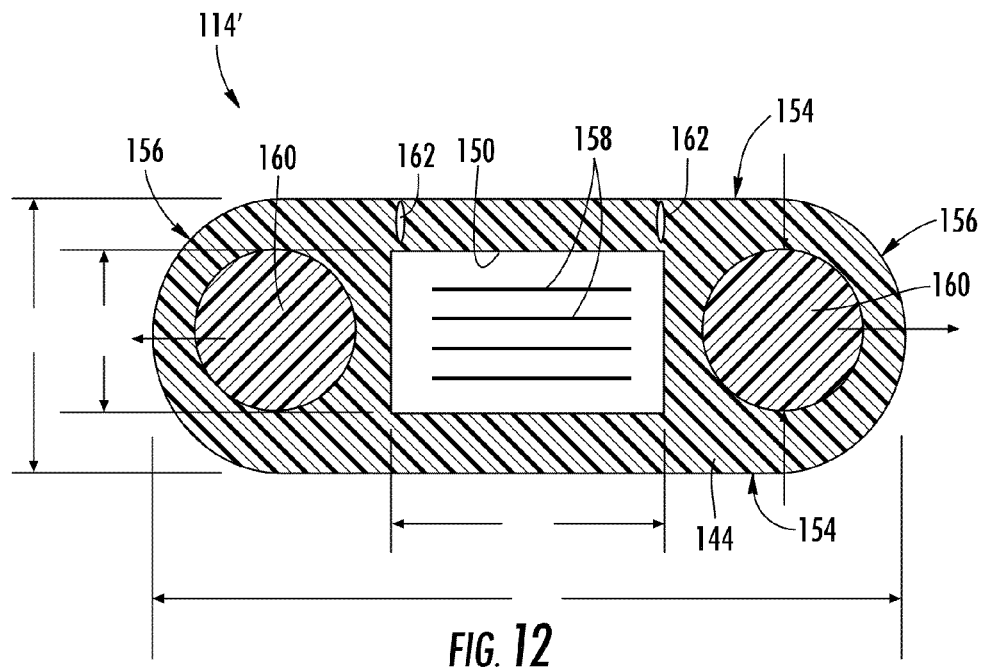
FIG. 12 is a cross-sectional view of a fiber optic cable taken along line 12-12 of FIG. 13 according to yet another exemplary embodiment.
Figure 13:
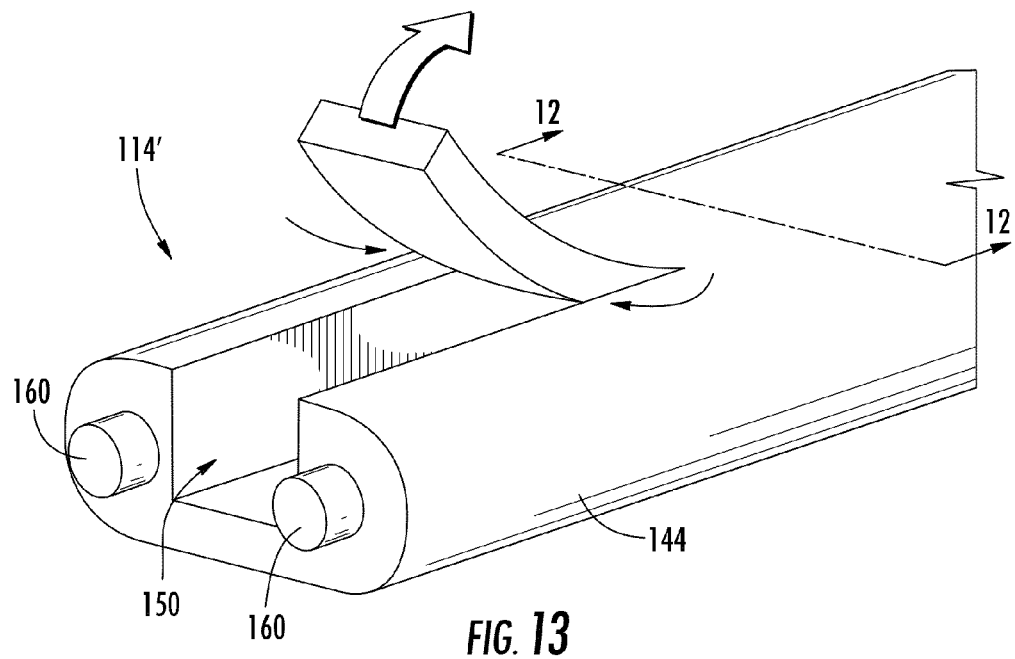
FIG. 13 is a perspective view of the fiber optic cable of FIG. 12 with the jacket being opened according to an exemplary embodiment.

Referring to FIGS. 12-13, in some embodiments the distribution cable 112 is a "flat" fiber optic cable and/or the tether cable 114' is a flat fiber optic cable. So-called "flat" fiber optic cables typically include an oblong cross-section (FIG. 12) with two longer sides 154 on the top and bottom, and two shorter sides 156 extending vertically therebetween. Such a shape may be particularly efficient for supporting stacks 158 of fiber optic ribbons, which are generally rectilinear. The shorter sides 156 of flat fiber optic cables are often rounded and the longer sides 154 are generally flat. In some cases, a flat cable may have somewhat rounded longer sides due to manufacturer molding techniques and design choices, making the flat cable somewhat oval or elliptical; or the sides 154 may include a dip, a groove, or a waving surface.

The interior of a flat fiber optic cable 114', may include two strength members 160, such as glass-reinforced plastic rods, stranded steel, or another reinforcement material. According to an exemplary embodiment, the strength members 160 extend in parallel with one another along the length of the cable 114'. Between the two strength members 160, the fiber optic cable includes optical fiber(s), such as multiple fibers connected together as a ribbon and/or stacks 158 of such ribbons (e.g., 6-fiber, 12-fiber, 24-fiber ribbons). In other embodiments, round or otherwise-shaped fiber optic cables are used for either or both of the distribution cable 112 and the tether cables 114, instead of flat cables.

According to an exemplary embodiment, the fiber optic cable 114' includes access features 162 that facilitate opening the jacket 144 to access the cavity 150 of the cable 114'. In some embodiments, the access features 162 include discontinuities of material co-extruded into the jacket 144, such as polypropylene discontinuities extruded into a medium-density polyethylene jacket. In some such embodiments, polyethylene is added to the polypropylene to improve bonding between the access features and the jacket. Use of access features 162 save time opening the jacket 144. Further, the access features 162 may facilitate opening the jacket 144 without cutting equipment, and may allow for opening of the jacket 144 with generic pliers. In other embodiments, the access features 162 may be a different material (e.g., polymer filament), and may not be embedded into the jacket. In still other embodiments, optical cables of cable assemblies disclosed herein do not include such access features.

In some embodiments, the fiber optic cable 114' may be used as one of the tether cables of the cable assembly shown in FIG. 1. Instead of accessing the cavity 150 (and ribbon therein) by cutting the opening 146 shown in FIG. 6, an operator may tear the jacket 144 open via the access features 162. In some embodiments, the access features 162 are located on ends of the cavity 150, and tearing opening the jacket 144 via such access features 162 fully opens the cavity 150. In other embodiments, one or more access features 162 are located above the center of the cavity, and tearing the jacket via the access features forms an elongate slot, similar to the slot 148 shown in FIG. 6. Once the ribbon 136 has been spliced and repositioned in the cavity 150, the jacket 144 of the cable 114' may be folded back over the cavity 150 and a heat-shrink tube 152 may be used to reseal the cavity 150.

Figure 14:
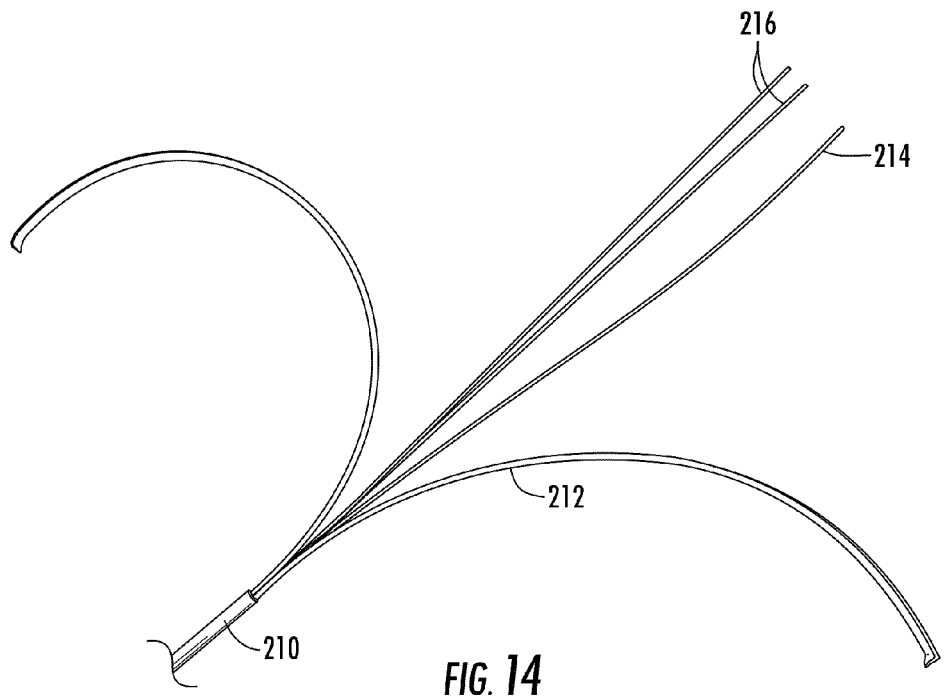
FIG. 14 is a perspective view of a fiber optic cable having an opened jacket from a perspective view according to an exemplary embodiment.
Figure 15:
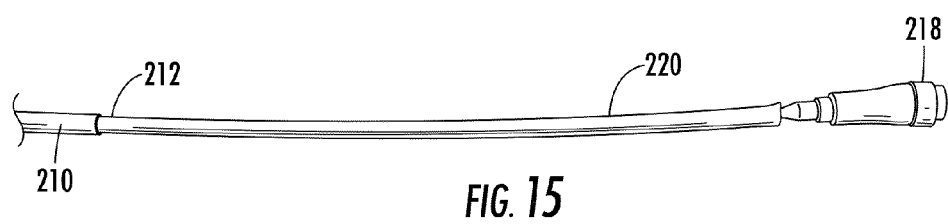
FIG. 15 is a perspective view of a connector attached to the cable of FIG. 14 from a perspective view according to an exemplary embodiment.
Figure 16:
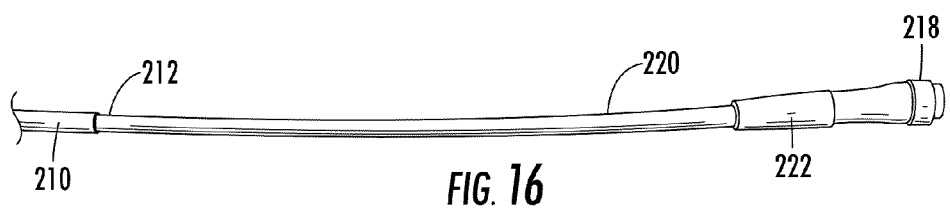
FIG. 16 is a perspective view of the cable assembly of FIG. 15 with the connector having a boot from a perspective view according to an exemplary embodiment.

Referring to FIGS. 14-16, the techniques and structures disclosed herein may be used to connectorize a pig-tail 210 or a tether cable. The jacket 212 of the cable may be split apart, such as using access features (see, e.g., features 162 as shown in FIG. 12), to provide access to one or more optical fibers 214 therein, such as a fiber optic ribbon. Strength members 216 may also be accessible when the jacket 212 is open. The one or more optical fibers 214 of the cable 210 may then be sliced to corresponding fiber(s) extending from a ferrule of a fiber optic connector, such as a multi-fiber connector 218 (FIGS. 15-16). As shown in FIG. 15, the jacket 21 may be closed over the spliced connection and a corresponding low-profile splice protector (see, e.g., FIGS. 4-5), as disclosed herein, and a heat shrink tube 220 or other enclosure may be drawn over to seal the jacket 212. A boot 222 may then be slid over the end of the cable 210 to control bending and stresses between the connector 218 and the cable 210, as shown in FIG. 16.

In contemplated embodiments, splice-on connectors, such as the connector 218 shown in FIGS. 15-16, may be used with tether cables 114 of cable assemblies, such as the cable assembly 110 shown in FIG. 1. Depending upon the length of the tether 114, among other factors, the splice may be between the ribbon 124 from the distribution cable 112 and the spliced on connector 218. In other embodiments, two splices may be used, such as splice between the distribution cable 112 and the tether cable 114, on one end of the tether cable 114, and a second splice between the tether cable 114 and the connector 218. However, a single splice may be preferred to minimize the loss to the overall cable assembly associated with each splice, where the ribbon 124 is inserted fully through the jacket 144 of the tether 114 to splice the connector 218.

The construction and arrangements of the cable assembly, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic cable assembly, comprising:
   a distribution cable having a cavity through which a fiber optic ribbon extends, wherein the ribbon comprises a plurality of optical fibers arranged side-by-side with one another and bound together by a common matrix, wherein the distribution cable includes a network access point at a mid-span location along the distribution cable, wherein the network access point comprises an opening between the cavity to the exterior of the distribution cable, and wherein at least a portion of the ribbon extends through the opening, out of the cavity, and away from the distribution cable; and
   a tether cable comprising a jacket and an optical fiber, wherein the tether cable is physically coupled to the distribution cable and the optical fiber of the tether cable is spliced to an optical fiber of the ribbon of the distribution cable, and
   wherein the corresponding spliced connection is surrounded by the jacket of the tether cable, whereby the jacket serves as a housing for the spliced connection.

2. The assembly of claim 1, wherein the optical fiber of the tether cable is part of a fiber optic ribbon of the tether cable that is fusion spliced to the ribbon of the distribution cable, and wherein the fiber optic ribbon of the distribution cable is one of a plurality of ribbons arranged in a stack and supported by the distribution cable.

3. The assembly of claim 2, further comprising a splice protector comprising a material that provides flexible support for the spliced connection, wherein the splice protector does not include a substrate.

4. The assembly of claim 3, wherein the material of the splice protector is a UV curable adhesive, and wherein the splice protector consists of the UV-curable adhesive.

5. The assembly of claim 2, further comprising a splice protector comprising a material that provides flexible support for the spliced connection, wherein the splice protector has a low-profile, having a thickness less than 1 mm thicker than the fiber optic ribbons at the spliced connection.

6. The assembly of claim 5, wherein the splice protector has a narrow-profile, having a width less than 1 mm wider than the fiber optic ribbons at the spliced connection.

7. The assembly of claim 1, further comprising an overmold enclosing a proximal end of the tether cable and the distribution cable at the mid-span location.

8. The assembly of claim 7, wherein both the distribution cable and the tether cable are flat fiber optic cables each including an oblong cross-section, comprising two glass reinforced plastic rod strength members embedded in a jacket of the respective cable and extending in parallel with one another along the length of the respective cable, on opposite sides of the respective fiber optic ribbon of the distribution cable or optical fiber of the tether cable, and wherein the cable comprises discontinuities of material in the jacket that facilitate tearing open the jacket to access the optical fiber of the tether and to place the spliced connection within the jacket of the tether, and wherein jacket of the tether surrounding the spliced connection is held closed by a heat shrink tube, wherein the heat shrink tube extends into the cavity of the distribution cable and provides separation between the overmold and the ribbon of the distribution cable that extends through the opening and out of the cavity.

9. A cable assembly comprising:
first and second fiber optic ribbons, each comprising a plurality of optical fibers arranged side-by-side with one another and bound together by a common matrix, wherein the optical fibers of the first ribbon are spliced with the optical fibers of the second ribbon such that the ribbons at the spliced connection have a common lengthwise axis, widthwise axis, and thickness axis;
a splice protector supporting the optical fibers of the first and second fiber optic ribbons at the spliced connection; and
a housing surrounding the splice protector, wherein the housing comprises a jacket of a fiber optic cable supporting the first fiber optic ribbon, and wherein the second fiber optic ribbon extends into the housing from an end of the jacket.

10. The assembly of claim 9, wherein the second fiber optic ribbon is connectorized, having a fiber optic connector attached on a distal end thereof.

11. The assembly of claim 10, wherein the connector is physically coupled to the end of the jacket, and wherein the housing further comprises a heat-shrink tube surrounding the jacket, which is, in turn, surrounding the splice protector.

12. The assembly of claim 9, wherein the splice protector comprises a material that provides flexible support for the spliced connection, wherein the splice protector is at least half as flexible as the first and second ribbons in bending about the widthwise axis.

13. The assembly of claim 12, wherein the material of the splice protector is a UV-curable adhesive, and wherein the splice protector consists of the UV-curable adhesive.

14. The assembly of claim 9, wherein the splice protector has a low-profile, having a thickness less than 1 mm thicker than the fiber optic ribbons at the spliced connection.

15. The assembly of claim 14, wherein the splice protector has a narrow-profile, having a width less than 1 mm wider than the fiber optic ribbons at the spliced connection.

16. A fiber optic cable assembly, comprising:
a fiber optic cable comprising a jacket and having a cavity through which a fiber optic ribbon extends, wherein the ribbon comprises a plurality of optical fibers arranged side-by side with one another and bound together by a common matrix; and
a multi-fiber connector supporting optical fibers that are fusion spliced to the ribbon of the fiber optic cable, wherein the corresponding spliced connection is surrounded by the jacket of the fiber optic cable, whereby the jacket serves as a housing for the spliced connection.

17. The assembly of claim 16, further comprising a splice protector comprising a material that provides flexible support for the spliced connection, wherein the splice protector does not include a substrate.

18. The assembly of claim 17, wherein the material of the splice protector is a UV-curable adhesive, and wherein the splice protector consists of the UV-curable adhesive.

19. The assembly of claim 16, further comprising a splice protector comprising a material that provides flexible support for the spliced connection, wherein the splice protector has a low-profile, having a thickness less than 1 mm thicker than the fiber optic ribbon at the spliced connection.

20. The assembly of claim 19, wherein the splice protector has a narrow-profile, having a width less than 1 mm wider than the fiber optic ribbon at the spliced connection.

* * * * *